United States Patent
Lambert et al.

(10) Patent No.: US 10,711,444 B2
(45) Date of Patent: Jul. 14, 2020

(54) TOILET INLET CONFIGURATION

(71) Applicant: Kohler Co., Kohler, WI (US)

(72) Inventors: Tony L. Lambert, Sheboygan, WI (US); Daniel N. Halloran, Saukville, WI (US); Randy O. Mesun, Sheboygan, WI (US); Andrew H. Matznick, Newton, WI (US)

(73) Assignee: KOHLER CO., Kohler, WI (US)

( * ) Notice: Subject to any disclaimer, the term of this patent is extended or adjusted under 35 U.S.C. 154(b) by 67 days.

(21) Appl. No.: 15/799,262

(22) Filed: Oct. 31, 2017

(65) Prior Publication Data

US 2018/0119401 A1    May 3, 2018

Related U.S. Application Data (60) Provisional application No. 62/415,899, filed on Nov. 1, 2016.

(51) Int. Cl.
*E03D 1/34* (2006.01)
*E03D 1/38* (2006.01)

(52) U.S. Cl.
CPC .............. *E03D 1/34* (2013.01); *E03D 1/38* (2013.01); *Y02A 20/412* (2018.01)

(58) Field of Classification Search
CPC .................................. E03D 1/38; E03D 1/34
USPC ............................................. 4/378, 348, 420
See application file for complete search history.

(56) References Cited

U.S. PATENT DOCUMENTS

| | | | |
|---|---|---|---|
| 5,666,674 A | * | 9/1997 | Hennessy ............... E03D 1/20 4/353 |
| 5,918,325 A | * | 7/1999 | Arita ...................... E03D 11/02 4/420 |
| 5,926,861 A | | 7/1999 | Frost |
| 6,237,164 B1 | | 5/2001 | Lafontaine et al. |
| 6,728,975 B2 | | 5/2004 | Han |
| 6,901,610 B1 | | 6/2005 | Jensen et al. |
| 7,383,593 B2 | | 6/2008 | Campbell |
| 7,640,604 B2 | | 1/2010 | Cummings |

(Continued)

FOREIGN PATENT DOCUMENTS

| | | |
|---|---|---|
| CN | 1369601 | 9/2002 |
| CN | 1685118 | 10/2005 |

(Continued)

OTHER PUBLICATIONS

Chinese Office Action for Chinese Patent Application No. 201711049648.8, dated Mar. 16, 2020.

*Primary Examiner* — Christine J Skubinna
(74) *Attorney, Agent, or Firm* — Foley & Lardner LLP (57) ABSTRACT

A toilet assembly includes a pedestal, a tank disposed on the pedestal, and an inlet chamber formed in the pedestal. The inlet chamber includes an inlet portion comprising an upstream end defining an upstream inner diameter, and a downstream end defining a downstream inner diameter less than the upstream inner diameter. The inlet chamber further includes an elbow extending downstream from the inlet portion, the elbow defining an elbow diameter substantially the same as the downstream inner diameter. The inlet portion is configured to receive water from the tank. The toilet assembly further includes a flush valve disposed in the tank, the valve defining a valve outlet disposed below the tank and in the inlet portion of the inlet chamber.

21 Claims, 7 Drawing Sheets

(56) References Cited

U.S. PATENT DOCUMENTS

| | | | |
|---|---|---|---|
| 8,079,095 B2 | 12/2011 | Jensen | |
| 8,196,231 B2 | 6/2012 | Hennessy | |
| 8,266,733 B2* | 9/2012 | Jensen | E03D 1/306 |
| | | | 4/378 |
| 8,316,475 B2 | 11/2012 | Grover | |
| 2004/0040080 A1* | 3/2004 | Prokopenko | E03D 1/34 |
| | | | 4/420 |
| 2006/0185068 A1* | 8/2006 | Halloran | E03D 1/306 |
| | | | 4/378 |
| 2009/0249537 A1 | 10/2009 | Jensen | |
| 2012/0174310 A1 | 7/2012 | Grover et al. | |
| 2015/0026876 A1 | 1/2015 | Shirakawa et al. | |

FOREIGN PATENT DOCUMENTS

| | | |
|---|---|---|
| CN | 103981934 | 8/2014 |
| CN | 105239655 | 1/2016 |
| WO | WO 03/060244 | 7/2003 |
| WO | WO 2012/033393 | 3/2012 |

* cited by examiner

TOILET INLET CONFIGURATION

CROSS-REFERENCE TO RELATED PATENT APPLICATION

The present application claims the benefit of and priority to U.S. Provisional Patent Application No. 62/415,899, filed Nov. 1, 2016, which is incorporated by reference herein in its entirety.

BACKGROUND

The present disclosure relates generally to the field of toilets. More specifically, the present disclosure relates to a toilet inlet configuration for reducing a volume of water required for flushing the toilet.

Generally, toilets which utilize larger volumes of water during a flush cycle have better flush performance (e.g., clog resistance, waste removal, bowl rinsing, etc.) than toilets which utilize smaller volumes of water. However, a combination of government regulations and scarcity of fresh water has caused toilets to utilize less water during a flush cycle. For example, the U.S. federal government set forth a maximum water consumption of 1.6 gallons per flush (gpf), with some states setting a maximum of 1.28 gpf. While some toilets may further reduce water consumption to approximately 1.0 gpf or less, these reductions in water consumption generally result in worse flush performance. It may be advantageous to improve the flow characteristics of a toilet inlet configuration to improve flush performance with reduced water consumption.

SUMMARY

One embodiment relates to a toilet assembly including a pedestal, a tank disposed on the pedestal, and an inlet chamber formed in the pedestal. The inlet chamber includes an inlet portion comprising an upstream end defining an upstream inner diameter, and a downstream end defining a downstream inner diameter less than the upstream inner diameter. The inlet chamber further includes an elbow extending downstream from the inlet portion, the elbow defining an elbow diameter substantially the same as the downstream inner diameter. The inlet portion is configured to receive water from the tank. The toilet assembly further includes a flush valve disposed in the tank, the valve defining a valve outlet disposed below the tank and in the inlet portion of the inlet chamber.

Another embodiment relates to a toilet pedestal including an inlet chamber having an inlet portion comprising an upstream end defining an upstream inner diameter, and a downstream end defining a downstream inner diameter less than the upstream inner diameter. The inlet chamber further includes an elbow extending downstream from the inlet portion, the elbow defining an elbow diameter substantially the same as the downstream inner diameter. The inlet chamber further includes a splitter portion extending downstream from the elbow. The inlet chamber is configured to receive a stream and the inlet chamber is configured to maintain the stream in substantially laminar flow throughout the inlet chamber.

Another embodiment relates to a method of flushing a toilet including providing a pedestal having an inlet chamber. The inlet chamber includes an inlet portion comprising an upstream end defining an upstream inner diameter, and a downstream end defining a downstream inner diameter less than the upstream inner diameter. The inlet chamber further includes an elbow extending downstream from the inlet portion, the elbow defining an elbow diameter substantially the same as the downstream inner diameter. The inlet chamber further includes a splitter portion extending downstream from the elbow. The method further includes providing a stream of water from a water source, through a valve outlet, to the downstream end of the inlet portion. The stream forms a water column having a substantially constant diameter extending between valve outlet and the downstream end of the inlet portion.

The foregoing summary is illustrative only and is not intended to be in any way limiting. In addition to the illustrative aspects, embodiments, and features described above, further aspects, embodiments, and features will become apparent by reference to the drawings and the following description.

BRIEF DESCRIPTION OF THE DRAWINGS

Further features, characteristics, and advantages of the present disclosure will become apparent to a person of ordinary skill in the art from the following detailed description of embodiments of the present disclosure, made with reference to the drawings annexed, in which like reference characters refer to like elements.

DETAILED DESCRIPTION

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential. The scope of protection is not defined by any particular embodiment described herein. Before turning to the figures, which illustrate exemplary embodiments in detail, it should be understood that the disclosure is not limited to the details or methodology set forth in the description or illustrated in the figures. It should also be understood that the terminology is for the purpose of the descriptions only and should not be regarded as limiting.

Figure 1:
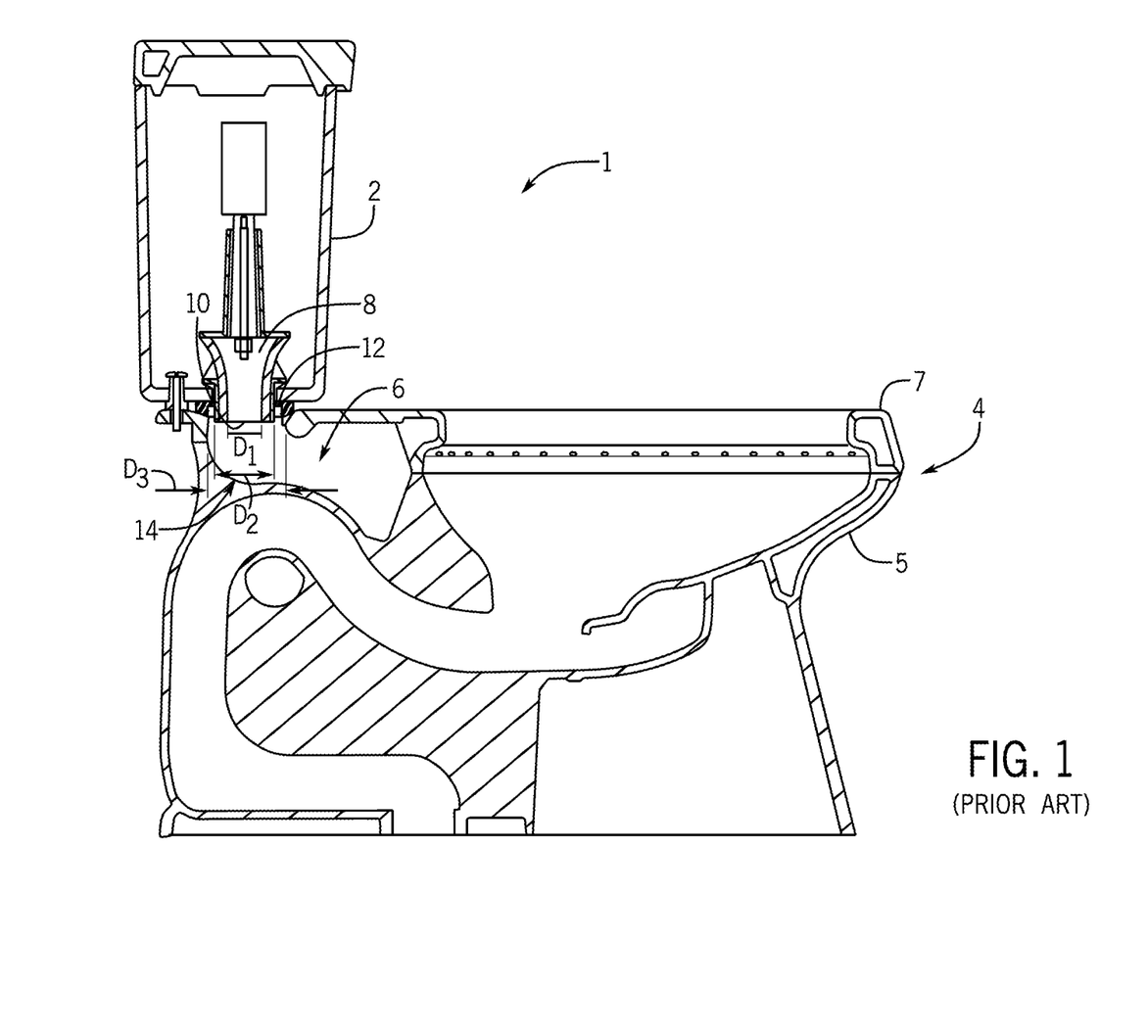
FIG. 1 is a cross-sectional view of a prior art toilet with a flush valve and toilet inlet chamber geometry that results in losses and areas of recirculation.

Referring now to FIG. 1, a cross-sectional view of a prior art toilet assembly 1 is shown. The toilet assembly 1 includes a tank 2 fluidly connected to a pedestal 4, which defines an inlet chamber 6 for receiving a stream of water from the tank 2 during a flush cycle. The introduction of the water stream from the tank 2 to the inlet chamber 6 is controlled by a flush valve 8 disposed in a lower portion of the tank 2. As shown in FIG. 1, a valve outlet 10 formed at a lower end of the flush valve 8 is disposed below the tank 2 and into the inlet chamber 6. The valve outlet 10 defines a valve outlet diameter $D_1$. The inlet chamber 6 defines an inlet opening 12 having an upper chamber inlet diameter $D_2$, which is greater than the valve outlet diameter $D_1$. An expansion chamber 14 is positioned directly downstream from the inlet opening 12. The expansion chamber 14 defines a expansion chamber diameter $D_3$ which is substantially the same as the upper chamber inlet diameter $D_2$, such that the expansion chamber 14 has a larger cross-sectional area than the lower end 10 of the flush valve 8.

Figure 2:
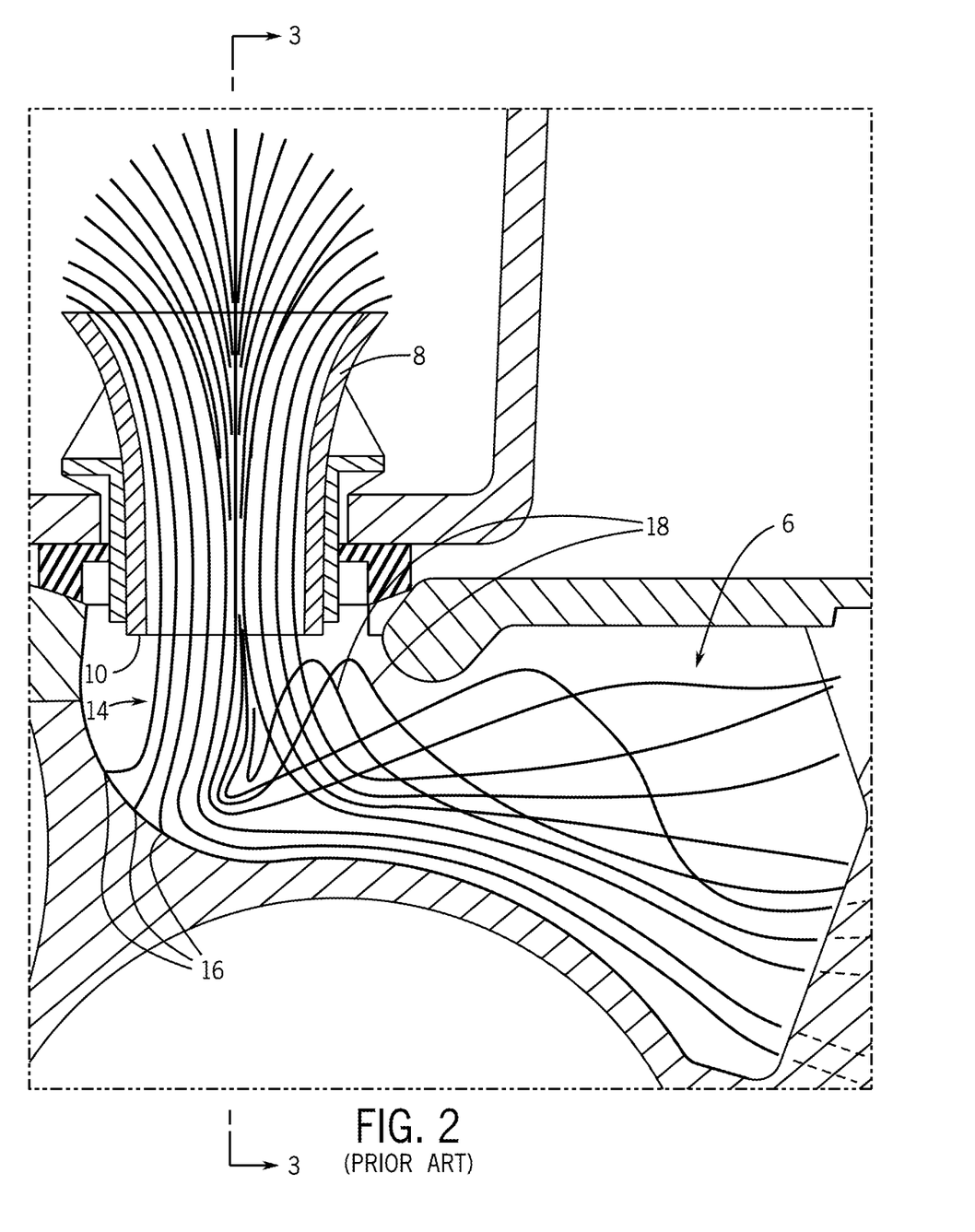
FIG. 2 is a close-up view of an expansion chamber in FIG. 1, including stream lines to show performance losses resulting from stream expansion.

Referring now to FIG. 2, a close-up cross-sectional view of the inlet chamber 6 is provided showing the flow of the stream of water from the tank 2 during the flush cycle. When the stream enters the expansion chamber 14, the increased cross-sectional area causes the stream to spread out laterally rather than maintain its laminar column provided in the flush valve 8. Further, as shown in FIG. 2, the stream of water is redirected in the expansion chamber 14 from a downward direction to a lateral direction for introduction into a flush rim and/or a sump. The lateral expansion of the stream generates stagnation points 16 for the stream along the expansion chamber 14, where the stream lines are defined orthogonal to the walls of the expansion chamber 14. Stagnation points in a stream result in significant energy losses, and a reduction in the volume flow rate, thereby reducing the performance of the toilet assembly 1.

Figure 3:
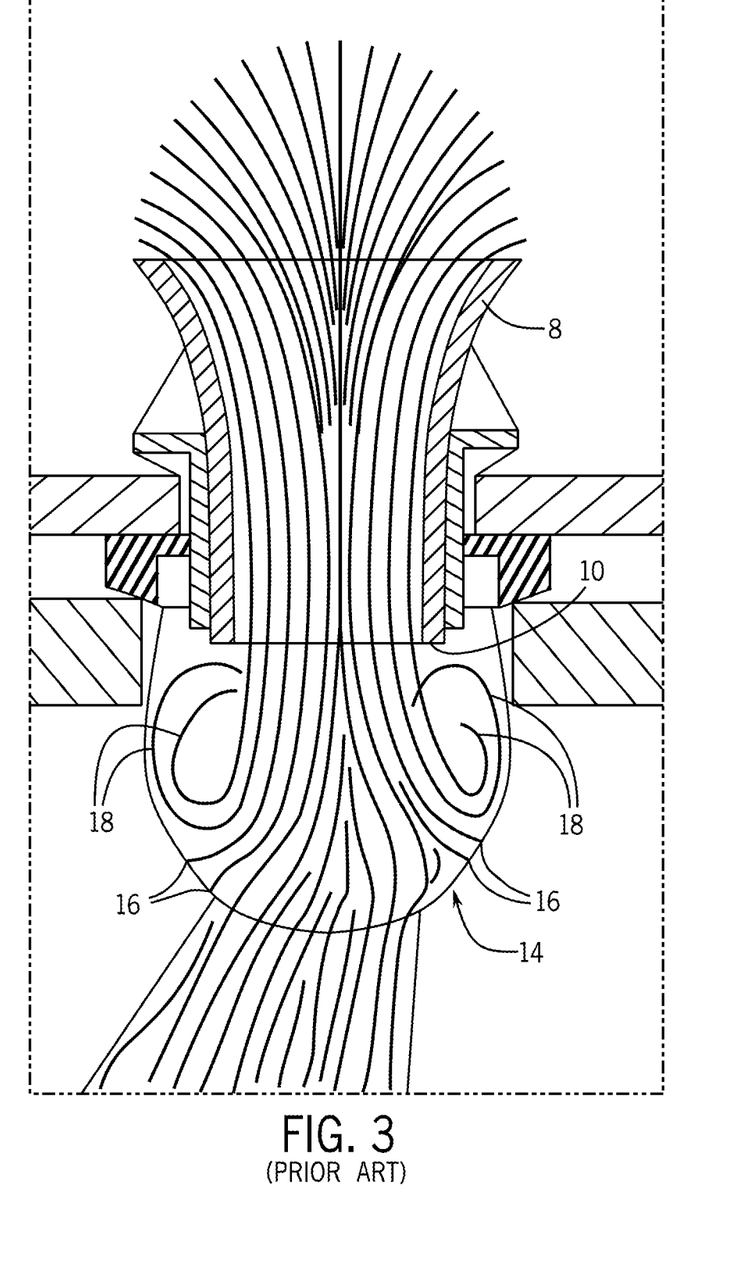
FIG. 3 is a rear cross-sectional view of the expansion chamber in FIG. 2, including the stream lines.

Referring now to FIG. 3, a close-up rear cross-sectional view of the expansion chamber 14 is provided showing the flow of the stream of water from the tank 2 during the flush cycle. As discussed with respect to FIG. 2, the stream spreads out when it is introduced to the expansion chamber 14. Besides forming stagnation points, the stream also generates vortices 18 as the expanding stream fills the full cross-sectional area of the expansion chamber 14 to flow tangential to the walls of the expansion chamber 14. The vortices 18 mix with the rest of the flow to generate turbulence in the inlet chamber 6, thereby further reducing the performance of the toilet assembly 1.

As shown in FIGS. 1-3, prior art configurations result in losses due to the geometry of the inlet chamber 6. As discussed above, sudden changes in flow cross sectional areas are a significant source of losses within physical systems. The present application improves the efficiency of the toilet supply subsystem by reducing the physical losses associated with the sudden expansion of tank water exiting a toilet flush valve. Specifically, the present application minimizes or eliminates these losses by matching the configuration (e.g., form, geometry, etc.) of the stream at the valve outlet with the adjoining toilet inlet geometry. In this configuration, which is described in further detail below, the stream of water passing from the flush valve to the inlet chamber minimizes the turbulence generated as water is redirected in the inlet chamber or maintains a completely laminar flow profile.

Figure 4:
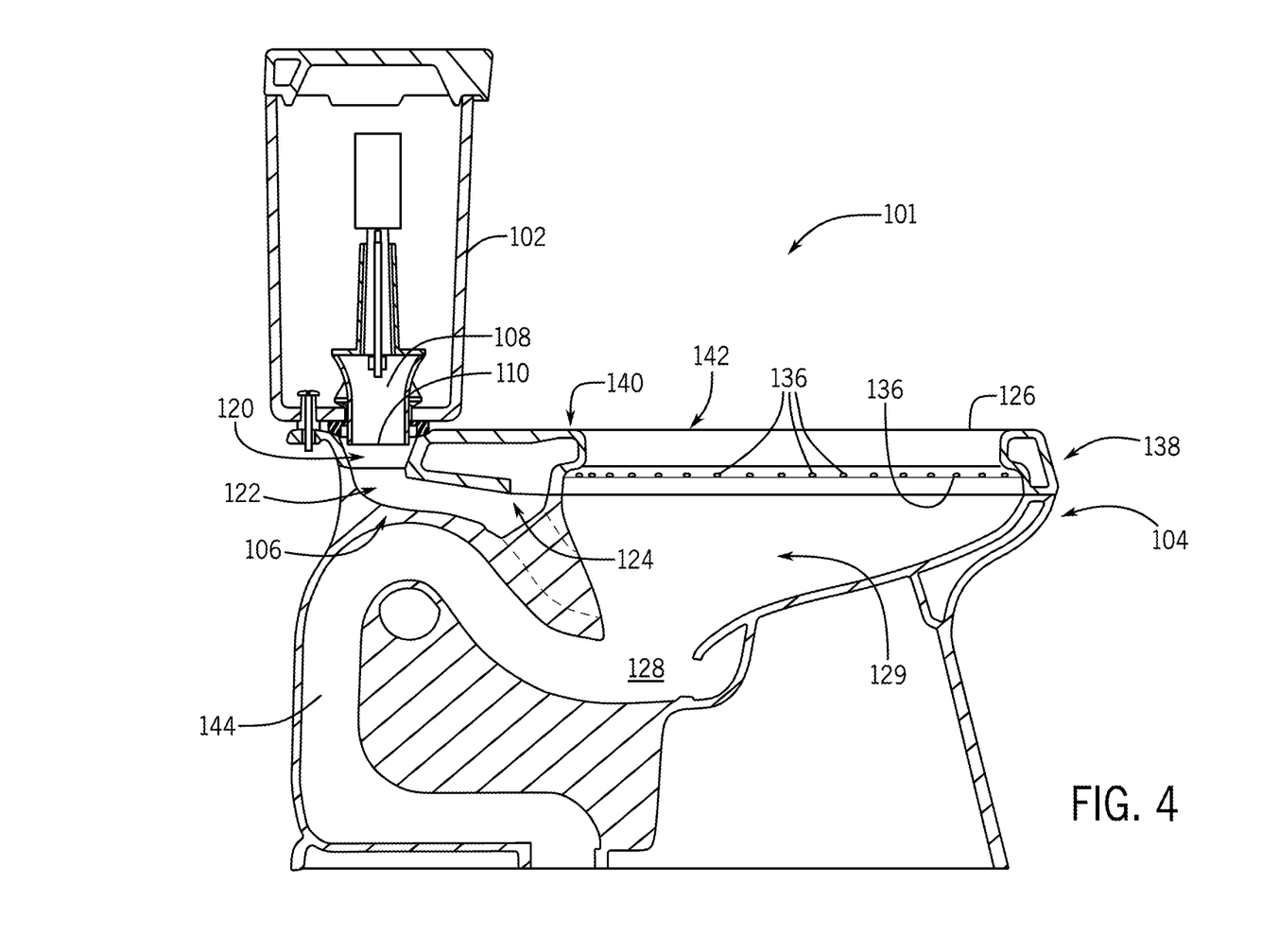
FIG. 4 is a cross-sectional view of a toilet assembly with an inlet chamber configuration for reducing toilet flush volume, according to an exemplary embodiment.
Figure 5:
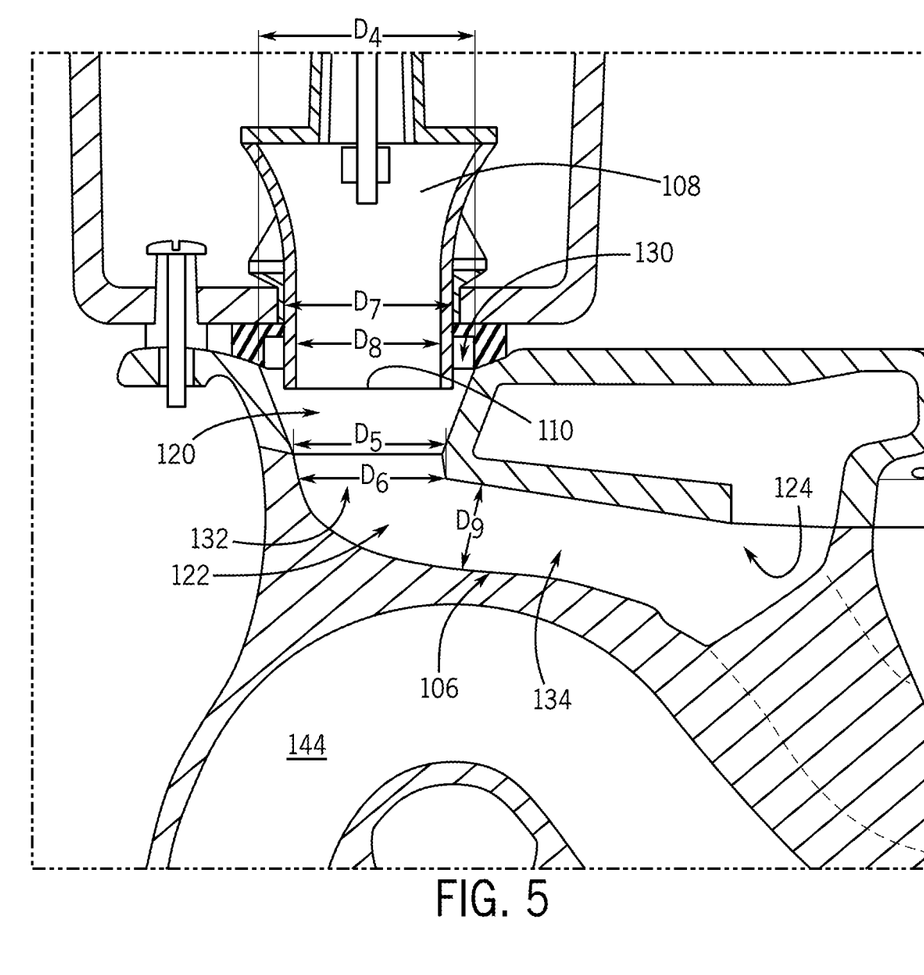
FIG. 5 is a close-up view of the inlet chamber in FIG. 4.
Figure 6:
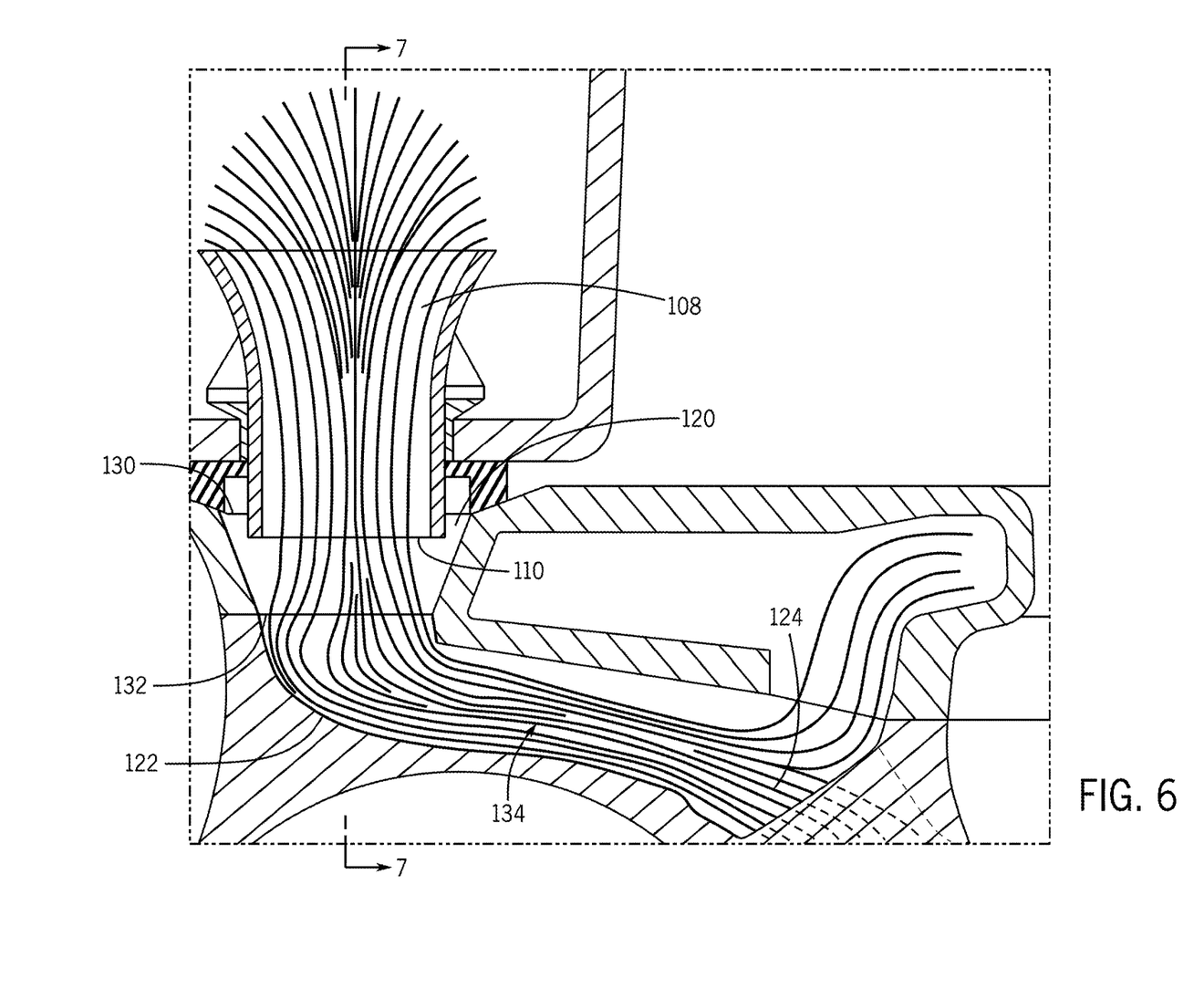
FIG. 6 is a is a close-up view of the inlet chamber in FIGS. 4 and 5, including stream lines to show laminar flow in the inlet chamber.
Figure 7:
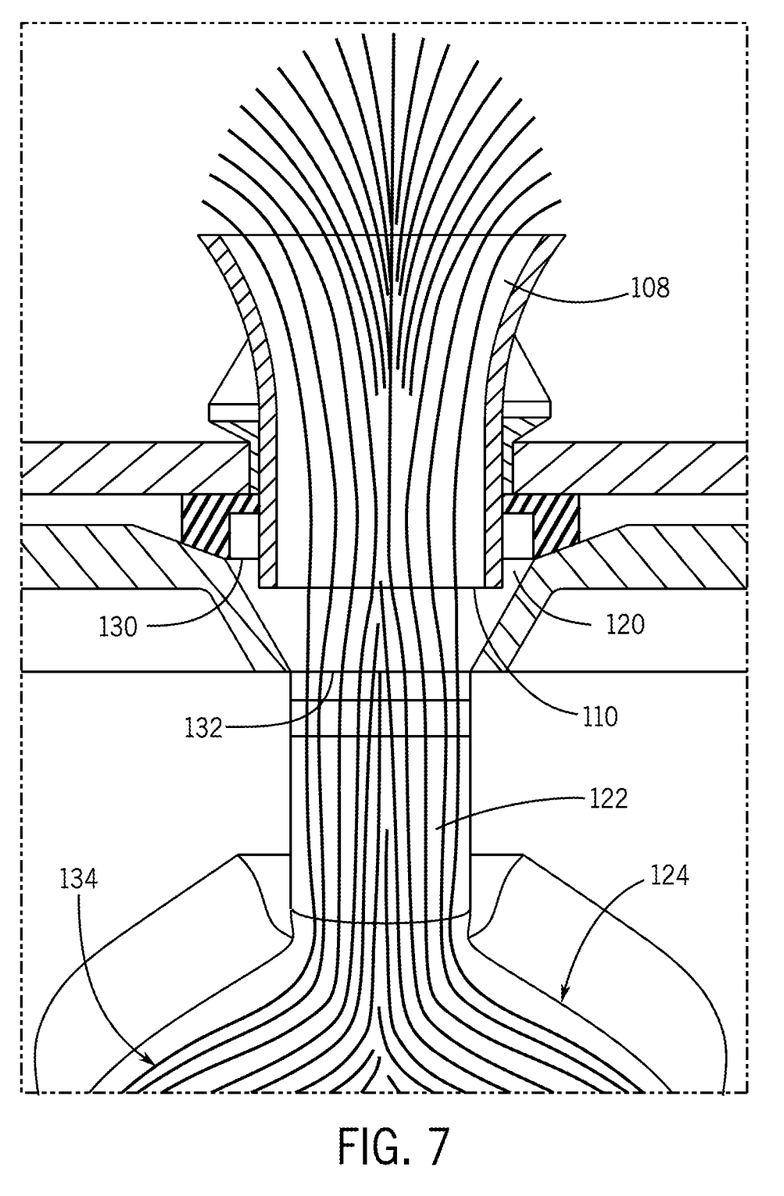
FIG. 7 is a rear cross-sectional view of the inlet chamber in FIG. 6, including the laminar stream lines.

Referring generally to FIGS. 4-7, a toilet assembly 101 is shown with an improved geometry for reducing flow losses during a flush cycle. Notably, FIGS. 6 and 7 show fluid streamlines maintaining a much more laminar flow than FIGS. 2 and 3, respectively.

Referring now to FIG. 4, a cross-sectional view of a toilet assembly 101 is shown according to an exemplary embodiment. The toilet assembly 101 includes a tank 102 fluidly connected to a pedestal 104 (i.e., a base), which defines an inlet chamber 106 for receiving a stream of water from the tank 102 during a flush cycle. The introduction of the water stream from the tank 102 to the inlet chamber 106 is controlled by a flush valve 108 disposed in a lower portion of the tank 102. The flush valve 108 depicted in FIG. 4 (and FIG. 1) is a canister flush valve, although other flush valves may be used. As shown in FIG. 4, a valve outlet 110 formed at a lower end of the flush valve 108 is disposed below the tank 102 and into the inlet chamber 106.

The inlet chamber 106 includes an inlet (i.e., first) portion 120 (e.g., a conical section) forming an opening in an upper surface of the pedestal 104 and configured to receive the valve outlet 110 therein. The inlet portion 120 extends vertically downward from the upper surface of the pedestal 104 and fluidly connects (e.g., directly) to an elbow 122 downstream from the inlet portion 120. The elbow 122 is configured to receive water flowing in a vertically downward direction in the flush valve 108 and the inlet portion 120 and redirect the water in a substantially lateral direction (e.g., toward a forward portion of the toilet assembly 101). The inlet portion 120 and the elbow 122 are configured to cooperate to maintain laminar flow of the water received therein. The inlet chamber further includes a splitter (i.e., second) portion 124 downstream from the elbow 122 and configured to separate the stream into a rim stream received in a rim 126 of the pedestal 104 and a sump stream received in a sump 128 of a bowl 129 formed in the pedestal 104.

Referring now to FIG. 5, a close-up view of the inlet chamber 106 of FIG. 4 is shown. The inlet portion 120 has a conical shape, which decreases in diameter in the downstream direction. An upstream end 130 of the inlet portion 120 defines an upstream (i.e., first, inlet, etc.) inner diameter $D_4$ and a downstream end 132 of the inlet portion 120 is formed at the elbow 122 and defines a downstream (i.e., second) inner diameter $D_5$. The downstream inner diameter $D_5$ is less than the upstream inner diameter $D_4$, such that the cross-sectional area at the downstream end 132 is less than the cross-sectional area of the upstream end 130. While FIG. 5 shows the inlet portion 120 of the inlet chamber 106 as having a conical body with straight walls, it should be understood that the inlet portion 120 may have other shapes, such that the downstream inner diameter $D_5$ is less than the upstream inner diameter $D_4$.

The flush valve 108 is received in the inlet portion 120, such that valve outlet 110 is disposed between the upstream end 130 and the downstream end 132. The valve outlet 110 defines a valve inner diameter $D_6$ and a valve outer diameter $D_7$. As shown in FIG. 5, the upstream inner diameter $D_4$ of the inlet portion 120 is greater than the valve outer diameter $D_7$, such that the valve outlet 110 may be inserted into the inlet portion 120 and extend below the upstream end 130. This difference in diameter enables the inlet portion 120 to receive flush valves 108 having different shapes and valve outer diameters $D_7$, improving clearances and/or tolerances for manufacturing and assembly. When the flush valve 108 is installed, the valve outlet 110 may be positioned above the downstream end 132 of the inlet portion 120, such that the valve 108 is spaced apart from the downstream end 132 and does not directly engage the inlet portion 120. The downstream inner diameter $D_5$ is substantially the same as or less than the valve inner diameter $D_6$ in order to maintain laminar flow by preventing sudden expansion of the stream of water as it is output from the valve outlet 110. As a result, a water column formed from the water stream extending from the valve outlet 110 to the downstream end 132 of the inlet portion 120 defines a substantially constant diameter (e.g., cross-sectional area) and maintains a laminar flow of the water stream as it is received in the elbow 122. In this configuration, the water column tangentially engages the sides of the valve outlet 110 and the downstream end 132 of the inlet portion 120.

The elbow 122 defines an elbow diameter (i.e., a third inner diameter) $D_8$ substantially similar to the downstream inner diameter $D_5$ of the inlet portion 120, which is substantially similar to the valve inner diameter $D_6$ at the valve outlet 110. By maintaining a constant, or substantially constant diameter from the flush valve 108, through the elbow 122, sudden expansion of the stream of water is minimized or eliminated during redirection from the vertical to the lateral direction, thereby preventing stagnation points and turbulence from forming in the stream. Accordingly, the inlet portion 120 and the elbow 122 are sized, shaped, and placed with respect to the valve inner diameter $D_6$ to maintain laminar flow in the stream of water during the flush cycle. In addition, the size, shape, and placement of the inlet portion 120 and elbow 122 may be determined based on a known flow rate of the flush valve 108 (e.g., based on the valve inner diameter $D_6$). For example, a slower flow rate may require a shorter distance between the valve outlet 110 and the downstream end 132 of the inlet portion 120 in order to bring the elbow 122 closer to the flush valve 108 and prevent expansion of the stream in the inlet portion 120. The slower the flow rate, the closer the valve outlet 110 must be to the downstream end 132. While FIG. 5 shows the flush valve 108 spaced apart from the walls of the inlet portion 120, according to other exemplary embodiments, the flush valve 108 may engage the inlet portion 120 proximate the downstream end 132.

Referring again to FIG. 1, the pedestal 4 for a conventional toilet is formed from a base 5 and a separate rim 7, which is coupled to an upper surface of the base 5. During the manufacturing process, a slurry is applied between the base 5 and the rim 7 to bond them together. When the rim 7 is pressed onto the base 5, excess slurry squeezes out into the inlet chamber 6. In order to provide a smooth finish in the inlet chamber 6 and prevent the slurry from hardening and obstructing flow in the inlet chamber 6, a person manufacturing the toilet must typically reach its arm into the inlet opening 12 and wipe clear the excess slurry. In order to expedite manufacturing, the expansion chamber 14 in a conventional toilet pedestal 4 is purposefully larger than the flush valve 8, such that it is large enough to accommodate a person's arm. With respect to FIG. 5, the inlet chamber 106, and the inlet portion 120 more specifically, is much smaller than the expansion chamber 14 of a conventional toilet. As a result, the inlet portion 120 may be too narrow to accommodate a person's arm and therefore assembly of the toilet assembly 101 may require specialized manufacturing equipment to clear excess slurry.

As discussed above, the splitter portion 124 of the inlet chamber 106 fluidly connects the elbow 122 to the rim 126 and the sump 128. As shown in FIG. 5, the splitter portion 124 forms a leg 134 extending from the elbow 122 and having a leg (i.e., fourth) diameter $D_9$ proximate the elbow 122 that is substantially the same as the elbow diameter $D_8$ and the valve inner diameter $D_6$. According to an exemplary embodiment, as shown in FIGS. 4 and 5, the leg 134 may gradually expand in the downstream direction from the elbow 122, such that the leg diameter $D_9$ increases gradually moving away from the elbow 122.

Referring now to FIG. 6, a close-up cross-sectional view of the inlet chamber 106 is provided showing the flow of the stream of water from the tank 102 during the flush cycle. As shown in FIG. 6, when the stream enters the inlet portion 120, the stream maintains its column shape and laminar flow, rather than experiencing lateral expansion as occurs in the conventional inlet chamber 6 shown in FIG. 2. As further shown in FIG. 6, the laminar flow extends through the elbow 122 and into the splitter portion 124.

Referring to FIG. 7, a close-up rear cross-sectional view of the inlet chamber 106 is provided showing the flow of the stream of water from the tank 102 during the flush cycle. As discussed with respect to FIG. 6, the stream maintains a laminar columnar flow when it is introduced to the inlet portion 120 and passes through the elbow 122. Whereas the conventional toilet generates vortices in the stream (e.g., as shown in FIG. 3), by maintaining laminar flow in the inlet portion 120 and the elbow 122, vortices are prevented from forming in the elbow 122, as shown in FIG. 7. Referring again to FIG. 6, the absence of vortices reduces or eliminates turbulence from forming downstream from the elbow 122 (e.g., in the splitter portion 124), thereby improving operational performance and efficiency of the toilet assembly 101. Further, because the stream maintains a laminar profile through the elbow 122, the stream continues to maintain a laminar profile through the splitter portion 124 even though FIGS. 4-6 show the leg 134 increasing in diameter. Specifically, while an expansion of cross-sectional area in a vertical flow causes a fluid to expand laterally, in the splitter portion 124, gravity prevents the stream from expanding upward in the leg 134. Furthermore, a lack of turbulence in the splitter portion 124 means that streamlines are not directed in the upward direction, preventing the stream from expanding upward or causing the energy losses described above.

Referring again to FIG. 4, in some embodiments, a plurality of holes 136 (i.e., openings) are formed in the rim 126 and allow water forming the rim stream to pass from the splitter portion 124 of the inlet chamber 106, through the rim 126, and into the bowl 129. These holes 136 may be configured (e.g., modified) to reduce water consumption and increase rinsing efficacy. For example, in conventional toilets (e.g., as shown in FIGS. 1-3), holes formed in a toilet rim may all have the same size regardless of location in the rim. However, as shown in FIG. 4, according to an exemplary embodiment, the holes 136 may vary in size (e.g., cross-sectional area) about the rim 126. For example, the rim 126 defines a forward (i.e., front) portion 138, a rear portion 140, and side portions 142 extending between the forward and rear portions 138, 140. The holes 136 formed in the forward portion 138 are larger (e.g., define a larger cross-sectional area) than the holes 136 formed in the rear portion 140 and the side portions 142 of the rim 126. According to an exemplary embodiment, the size of the holes 136 may increase gradually moving from the rear portion 140 to the forward portion 138. The holes 136 are smaller proximate the water source for the rim 126 (e.g., the splitter portion 124), and larger further away from the water source, such that the smaller holes 136 restrict the flow closer to the water source, allowing more water to pass over the rear and side portions 140, 142 and flow through the holes 136 in the forward portion 138. In this configuration, water may pass substantially evenly annularly about the toilet, ensuring effective wash down of all portions of the bowl 129. According to some embodiments, the holes 136 may be configured such that water flows into a trapway 144 of the toilet assembly 101 at an optimal time. The location or size of the holes 136 may further be varied to optimize the flow of water into the trapway 144.

As illustrated in FIGS. 4-7, the inlet chamber 106 is integrally-formed as part of the pedestal 104. This configuration has a benefit of lower manufacturing cost. However, it should be understood that in alternative embodiments, individual components or assemblies may be used. The individual components or assemblies may be made of plastic or other non-vitreous material. It should be noted that while the illustrations are that of a two-piece toilet construction (e.g., separate tank 102 and pedestal 104), the inlet chamber 106 may be incorporated into all other types of toilet categories, including one-piece, wall-hung, gravity-fed, etc. For example, for a toilet assembly 101 with a flushometer for supplying water from a water source to the inlet chamber 106, the outlet of the flushometer may have substantially the same characteristics of valve outlet 110 and may be received in the inlet chamber 106 in substantially the same way as described above. It should be understood that in any configuration, the valve outlet 110 may refer to outlet opening of a conduit in which the flush valve 108 is disposed. Specifically, the shape and diameter of the valve outlet 110 defines the flow profile at the valve outlet 110 and required geometry of the inlet portion 120.

According to any embodiment, a toilet assembly includes a base or pedestal. The base includes an inlet chamber defined by a conical section and an elbow. A first end of the conical section has a first diameter and receives a flush valve with a second diameter smaller than the first diameter. The second end of the conical section has a third diameter. The third diameter may be smaller than or equal to the second diameter. The elbow may have a fourth diameter defining a downstream portion of the elbow. The fourth diameter may be substantially similar to the third diameter. The fourth diameter may be constant, or may gradually increase as the diameter moves downstream. While diameters are described, cross sectional areas of the designated components may follow a similar comparison of size with other components as the diameters. However, other embodiments may include or omit certain components or dimensions to suit particular applications.

One embodiment relates to a toilet base that includes an inlet chamber. The inlet chamber includes a conical section that can receive a flush valve having an outlet defining a first diameter and an elbow downstream from the conical section. In some embodiments, the conical section defines an upper end having a second diameter greater than the first diameter and a lower end having a third diameter less than the first diameter.

Another embodiment relates to a toilet base that includes an inlet chamber. The inlet chamber includes a conical section and an elbow downstream from the conical section, the conical section can receive a flush valve having an outlet defining a first diameter. In some embodiments, the conical section defines an upper end having a second diameter greater than the first diameter and a lower end having a third diameter less than the first diameter. In some embodiments, the elbow defines an upstream end having the third diameter and a downstream end having a fourth diameter. In some embodiments, the outlet of the flush valve is disposed between the upper and lower ends of the conical section. In some embodiments, the inlet chamber maintains water from the flush valve in laminar flow. In some embodiments, at least one of a size, shape or position of the conical section and/or the elbow is determined by a flow rate through the flush valve. In some embodiments, the fourth diameter is substantially the same as the third diameter.

Yet another embodiment relates to a method of flushing a toilet. The method includes opening a flush valve, water forming a laminar flow through the flush valve, the water entering a conical inlet of an inlet chamber without engaging walls of the conical inlet, the water contacting a lower wall of an elbow downstream of the conical inlet. In some embodiments, laminar flow is maintained from the flush valve through the inlet chamber.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the reduced flush volume toilets as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the disclosure.

Other substitutions, modifications, changes and omissions may also be made in the design, operating conditions and arrangement of the various exemplary embodiments without departing from the scope of the present disclosure. For example, any element (e.g., inlet chamber, inlet portion, elbow, splitter portion, rim, sump, leg, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the disclosure.

What is claimed is:

1. A toilet assembly comprising:
   a pedestal;
   a tank disposed on the pedestal;
   an inlet chamber formed in the pedestal, the inlet chamber comprising:
      an inlet portion comprising an upstream end defining an upstream inner diameter, and a downstream end defining a downstream inner diameter less than the upstream inner diameter, the inlet portion configured to receive water from the tank;
      an elbow extending downstream from the inlet portion, the elbow defining an elbow diameter substantially the same as the downstream inner diameter;
      a leg extending downstream from the elbow; and
      a splitter portion downstream from the leg, wherein the splitter portion divides water flow between a rim of the toilet assembly and a bowl of the toilet assembly; and
   a flush valve disposed in the tank, the valve defining a valve outlet disposed below the tank and in the inlet portion of the inlet chamber.

2. The toilet assembly of claim 1, wherein the valve outlet extends below the upstream end to a region of the inlet portion that has an inner diameter that is less than the upstream inner diameter.

3. The toilet assembly of claim 1, wherein:
   the valve outlet defines a valve inner diameter substantially the same as the downstream inner diameter;
   the valve outlet defines a valve outer diameter less than the upstream inner diameter; and
   the valve outlet is disposed proximate the downstream end of the inlet portion, such that the toilet assembly is configured to maintain substantially laminar flow in a stream passing from the flush valve, through the inlet portion, and into the elbow.

4. The toilet assembly of claim 1, wherein the inlet portion defines a conical shape.

5. The toilet assembly of claim 1, wherein the elbow is configured to redirect a stream from a vertical direction in the inlet portion to an approximately lateral direction; and
   wherein the elbow is configured to maintain the stream in a laminar flow.

6. The toilet assembly of claim 1, wherein:
   the leg defines a leg diameter; and
   the leg diameter proximate the elbow is substantially the same as the elbow diameter.

7. The toilet assembly of claim 6, wherein the leg diameter increases moving away from the elbow and toward the splitter portion.

8. A toilet pedestal comprising:
   an inlet chamber comprising:
      an inlet portion comprising an upstream end defining an upstream inner diameter, and a downstream end defining a downstream inner diameter less than the upstream inner diameter, the inlet chamber configured to receive a stream and to maintain the stream in substantially laminar flow throughout the inlet chamber;
      an elbow extending downstream from the inlet portion, the elbow defining an elbow diameter substantially the same as the downstream inner diameter;
      a leg extending downstream from the elbow; and
      a splitter portion extending downstream from the leg, wherein the splitter portion divides water flow between a rim of the toilet pedestal and a bowl of the toilet pedestal.

9. The toilet pedestal of claim 8, wherein the inlet portion is configured to receive a flush valve defining a valve outlet, and wherein the valve outlet extends below the upstream end to a region of the inlet portion that has an inner diameter that is less than the upstream inner diameter.

10. The toilet pedestal of claim 9, wherein the valve outlet defines a valve outlet inner diameter substantially the same as the downstream inner diameter.

11. The toilet pedestal of claim 8, wherein the inlet portion defines a conical shape.

12. The toilet pedestal of claim 8, wherein the elbow is configured to redirect the stream from a vertical direction in the inlet portion to an approximately lateral direction without generating stagnation points in the stream.

13. The toilet pedestal of claim 8, wherein the splitter portion forms a leg extending downstream from the elbow, the leg defining a leg diameter;
   wherein the leg diameter proximate the elbow is substantially the same as the elbow diameter.

14. The toilet pedestal of claim 13, wherein the leg diameter increases moving away from the elbow.

15. The toilet pedestal of claim 8, further comprising:
   the rim, wherein the rim is configured to receive a portion of the stream from the splitter portion, wherein the rim defines a forward portion and a rear portion; and
   a plurality of holes formed in the rim and configured to pass the stream to a bowl;
   wherein a cross-sectional area of the holes proximate the forward portion of the rim is greater than the cross-sectional area of the holes proximate the rear portion of the rim.

16. A method of flushing a toilet comprising:
   providing a pedestal having an inlet chamber comprising:
      an inlet portion comprising an upstream end defining an upstream inner diameter, and a downstream end defining a downstream inner diameter less than the upstream inner diameter;
      an elbow extending downstream from the inlet portion, the elbow defining an elbow diameter substantially the same as the downstream inner diameter;
      a leg extending downstream from the elbow; and
      a splitter portion extending downstream from the leg, wherein the splitter portion divides water flow between a rim of the pedestal and a bowl of the pedestal; and
   providing a stream of water from a water source, through a valve outlet, to the downstream end of the inlet portion;
   wherein the stream forms a water column having a substantially constant diameter extending between valve outlet and the downstream end of the inlet portion.

17. The method of claim 16, wherein the valve outlet defines a valve inner diameter substantially the same as the downstream inner diameter.

18. The method of claim 16, wherein the diameter of the water column is substantially the same as the valve inner diameter and the downstream inner diameter.

19. The method of claim 16, wherein the elbow receives the stream from the inlet portion; and
   wherein the elbow maintains the stream in substantially laminar flow.

20. The method of claim 16, wherein the splitter portion receives the stream from the elbow; and
   wherein the splitter portion maintains the stream in substantially laminar flow.

21. The toilet assembly of claim 1, wherein the flush valve is spaced apart from and does not directly engage the inlet portion.

\* \* \* \* \*